(12) United States Patent
Wang

(10) Patent No.: US 12,073,141 B2
(45) Date of Patent: Aug. 27, 2024

(54) DISPLAY WALL DRIVING SYSTEM AND DRIVING METHOD

(71) Applicant: TCL China Star Optoelectronics Technology Co., Ltd., Guangdong (CN)

(72) Inventor: Kai Wang, Guangdong (CN)

(73) Assignee: TCL China Star Optoelectronics Technology Co., Ltd., Shenzhen (CN)

(*) Notice: Subject to any disclaimer, the term of this patent is extended or adjusted under 35 U.S.C. 154(b) by 0 days.

(21) Appl. No.: 17/620,779

(22) PCT Filed: Dec. 10, 2021

(86) PCT No.: PCT/CN2021/137160
§ 371 (c)(1),
(2) Date: Dec. 20, 2021

(87) PCT Pub. No.: WO2023/092698
PCT Pub. Date: Jun. 1, 2023

(65) Prior Publication Data
US 2024/0028285 A1    Jan. 25, 2024

(30) Foreign Application Priority Data
Nov. 29, 2021    (CN) .......................... 202111429173.1

(51) Int. Cl.
*G06F 3/14*    (2006.01)
*G06T 1/20*    (2006.01)
*G09G 3/20*    (2006.01)

(52) U.S. Cl.
CPC .......... *G06F 3/1446* (2013.01); *G06F 3/1438* (2013.01); *G06T 1/20* (2013.01); *G09G 3/20* (2013.01); *G09G 2300/026* (2013.01)

(58) Field of Classification Search
CPC ....... G06F 3/1446; G06F 3/1438; G06T 1/20; G09G 2300/02; G09G 2300/026
See application file for complete search history.

(56) References Cited

U.S. PATENT DOCUMENTS

2011/0246904 A1* 10/2011 Pinto ....................... G06F 9/452
715/740
2015/0255041 A1* 9/2015 Liu .......................... G09G 5/18
345/213

(Continued)

FOREIGN PATENT DOCUMENTS

CN    101739980    6/2010
CN    103513591    1/2014

(Continued)

OTHER PUBLICATIONS

Yoo et al. ("Volumetric Head-Mounted Display With Locally Adaptive Focal Blocks"), IEEE, 2020 (Year: 2020).*

*Primary Examiner* — Sing-Wai Wu
*Assistant Examiner* — Khoa Vu

(57) ABSTRACT

A driving system and a driving method for driving a display wall are disclosed. The driving system includes signal transforming units, interface transforming units, sub-display screen driving circuits and sub-displays. The driving system is simple. It means that a small number of circuit boards are required to achieving the driving of the display wall and thus the cost is reduced.

19 Claims, 1 Drawing Sheet

(56) References Cited

U.S. PATENT DOCUMENTS

| | | | | |
|---|---|---|---|---|
| 2016/0055830 A1* | 2/2016 | Lee | ........................ | G06F 3/1446 |
| | | | | 345/1.3 |
| 2020/0089385 A1* | 3/2020 | Han | .................... | G06F 3/04166 |
| 2021/0193067 A1* | 6/2021 | Shao | .................... | G09G 3/3685 |
| 2022/0208073 A1* | 6/2022 | Wai | ........................ | G09G 3/2074 |
| 2023/0267878 A1* | 8/2023 | Seo | ........................ | G06F 3/1446 |
| | | | | 345/204 |
| 2023/0370669 A1* | 11/2023 | Kim | .................... | H04N 21/436 |

FOREIGN PATENT DOCUMENTS

| | | |
|---|---|---|
| CN | 103531047 | 1/2014 |
| CN | 104112441 | 10/2014 |
| CN | 105516629 | 4/2016 |
| CN | 205810348 | 12/2016 |
| CN | 206100251 | 4/2017 |
| CN | 207752739 | 8/2018 |
| CN | 210721433 | 6/2020 |
| CN | 113055712 | 6/2021 |
| CN | 113542622 | 10/2021 |
| EP | 2947873 | 11/2015 |

* cited by examiner

DISPLAY WALL DRIVING SYSTEM AND DRIVING METHOD

RELATED APPLICATIONS

This application is a National Phase of PCT Patent Application No. PCT/CN2021/137160 having International filing date of Dec. 10, 2021, which claims the benefit of priority of China Patent Application No. 202111429173.1 filed on Nov. 29, 2021. The contents of the above applications are all incorporated by reference as if fully set forth herein in their entirety.

FIELD AND BACKGROUND OF THE INVENTION

The present disclosure relates to a display panel driving technology, and more particularly, to a driving system for driving a display wall.

In the display panel industry, the business display wall is more and more popular. The display wall is widely used in a conference or a shopping mall. The flexibility of the display wall makes it possible to meet the high-resolution demands in different conference places. In addition, the auto-stereoscopy technology is a recently developed technology and gives the viewer astonishing visual effects and thus attracts the demands of the consumers.

As the development of 8K displays, the 8K display wall gradually enters the display industry. However, there is no enough solutions to drive the 8K display wall. A common solution could only support the display wall to display an image of a 4K or 8K resolution. However, the conventional auto-stereoscopy solution is basically focused on 8K or lower resolution, which means it cannot support higher resolution 3D display. Furthermore, the related driving system is complicated and the related cost is high.

SUMMARY OF THE INVENTION

One objective of an embodiment of the present disclosure is to provide a driving system and a driving method for driving a display wall, to solve the above-mentioned issue of complicated driving system for supporting 3D 8K display images and high costs.

According to an embodiment of the present disclosure, a driving system for driving a display wall is disclosed. The display wall comprises M*N sub-display screens. The driving system comprises: a plurality of interface transforming units, configured to transform interfaces; and a plurality of signal transforming units, electrically connected to the plurality of interface transforming units, configured to receive an external driving signal and send the external driving signal to the interface transforming units. Each of the M*N sub-display screens comprises a sub-display screen driving circuit. The plurality of interface transforming units are further configured to receive the external driving signal from the signal transforming units and send the external driving signal to the sub-display screen driving circuit; and wherein M is an integer greater than or equal to 1, and N is an integer greater than or equal to 1.

Optionally, one of the interface transforming units comprises a signal input interface and a signal output interface, and a data transmission protocol corresponding to the signal input interface and a data transmission protocol corresponding to the signal output interface do not match.

Optionally, one of the signal transforming units comprises a signal input interface and a signal output interface, and a data transmission protocol corresponding to the signal input interface and a data transmission protocol corresponding to the signal output interface match.

Optionally, a number of the interface transforming units is identical to a number of the sub-display screen driving circuits.

Optionally, the number of the interface transforming units is identical to a number of the signal transforming units.

Optionally, one of the signal transforming units is connected to one of the interface transforming units through the signal output interfaces of the one of the signal transforming units.

Optionally, a number of the signal transforming units is lower than a number of the interface transforming units.

Optionally, one of the signal transforming units is connected to some of the interface transforming units through the signal output interfaces of the one of the signal transforming units.

Optionally, an odd number of the signal output interfaces of one of the signal transforming units are connected to one of the interface transforming units.

Optionally, the driving system further comprises a synchronization module, configured to synchronize driving signals outputted from the signal transforming units.

Optionally, the driving system further comprises a plurality of the synchronization modules physically connected through a network to be synchronous.

Optionally, the interface transforming units are synchronous in timing though a cable.

Optionally, the signal output interface of the signal transforming units is a DP interface.

Optionally, when a bandwidth of a video image is larger, then a number of the DP interfaces for transmitting a video signal is greater.

Optionally, when a transmission rate of the DP interface is lower, then a number of the DP interfaces for transmitting a video signal is greater. When the transmission rate of the DP interface is 8.1 Gbps, the number of the DP interfaces is two and the two DP interfaces transmit 8K60 Hz signals; and when the transmission rate of the DP interface is 5.4 Gbps, the number of the DP interfaces is four and the four DP interfaces transmit 8K60 Hz signals.

Optionally, one of the signal transforming units is a P4000 graphic card.

Optionally, one of the interface transforming units is an Arrial 10 circuit.

Optionally, the driving system further comprises a screen transforming module, configured to transform a screen corresponding to an initial driving signal into a 3D screen, generate a driving signal corresponding to the 3D screen, and send the driving signal to the signal transforming units.

According to an embodiment of the present disclosure, a driving method for driving a display wall is disclosed. The driving method uses the above-mentioned driving system, and the driving method comprises: utilizing the signal transforming unit to receive an initial driving signal and to transform the initial driving signal to a driving signal capable of driving the display wall to display images; utilizing the signal transforming units to send the driving signal to the interface transforming units to use the interface transforming units to achieve an interface transformation; and utilizing the interface transforming units to send the driving signal to the sub-display screen driving circuit to use the sub-display screen driving circuit to control the display wall to display images.

According to an embodiment of the present disclosure, a driving system and a driving method for driving a display wall are disclosed. The driving system comprises a plurality of signal transforming units, a plurality of interface transforming units for transforming interfaces, and a plurality of sub-display screen driving circuits. Each of the signal transforming units is used to receive an external driving signal and send the driving signal to the interface transforming units. The interface transforming units are used to receive the external driving signal from the signal transforming units and send the external driving signal to the sub-display screen driving circuit to drive the sub-display screen to display images. The driving system merely comprises the signal transforming units, the interface transforming units, sub-display driving circuits and the sub-displays. The driving system is simple. It means that a small number of circuit boards are required to achieving the driving of the display wall and thus the cost is reduced.

BRIEF DESCRIPTION OF THE SEVERAL VIEWS OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF SPECIFIC EMBODIMENTS OF THE INVENTION

Figure 1:
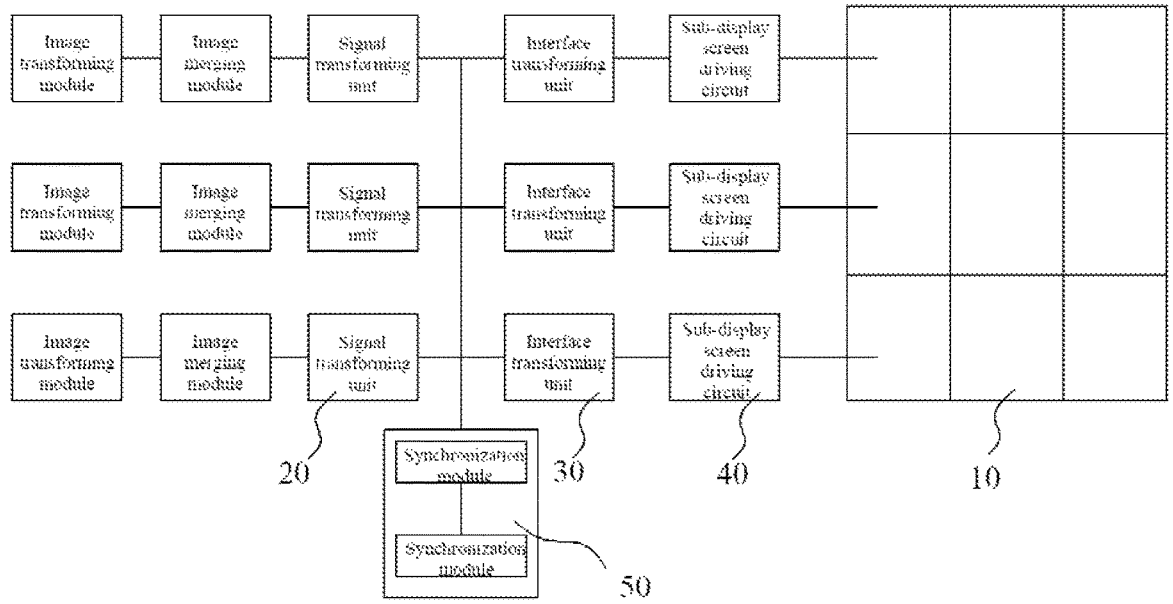
FIG. 1 is a diagram of a driving system for driving a display wall according to an embodiment of the present disclosure.

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

It is understood that terminologies, such as "center," "longitudinal," "horizontal," "length," "width," "thickness," "upper," "lower," "before," "after," "left," "right," "vertical," "horizontal," "top," "bottom," "inner," "outer," "clockwise," and "counterclockwise," are locations and positions regarding the figures. These terms merely facilitate and simplify descriptions of the embodiments instead of indicating or implying the device or components to be arranged on specified locations, to have specific positional structures and operations. These terms shall not be construed in an ideal or excessively formal meaning unless it is clearly defined in the present specification. In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present disclosure, the meaning of "plural" is two or more, unless otherwise specifically defined.

All of the terminologies containing one or more technical or scientific terminologies have the same meanings that persons skilled in the art understand ordinarily unless they are not defined otherwise. For example," arrange," "couple," and "connect," should be understood generally in the embodiments of the present disclosure. For example, "firmly connect," "detachably connect," and "integrally connect" are all possible. It is also possible that "mechanically connect," "electrically connect," and "mutually communicate" are used. It is also possible that "directly couple," "indirectly couple via a medium," and "two components mutually interact" are used.

All of the terminologies containing one or more technical or scientific terminologies have the same meanings that persons skilled in the art understand ordinarily unless they are not defined otherwise. For example, "upper" or "lower" of a first characteristic and a second characteristic may include a direct touch between the first and second characteristics. The first and second characteristics are not directly touched; instead, the first and second characteristics are touched via other characteristics between the first and second characteristics. Besides, the first characteristic arranged on/above/over the second characteristic implies that the first characteristic arranged right above/obliquely above or merely means that the level of the first characteristic is higher than the level of the second characteristic. The first characteristic arranged under/below/beneath the second characteristic implies that the first characteristic arranged right under/obliquely under or merely means that the level of the first characteristic is lower than the level of the second characteristic.

Please refer to FIG. 1. FIG. 1 is a diagram of a driving system for driving a display wall according to an embodiment of the present disclosure. As shown in FIG. 1, the display wall comprises M*N sub-display screens 10. The images shown in M*N sub-display screens are combined as a complete image. The driving system comprises a plurality of signal transforming units 20 and a plurality of interface transforming units 30 for transforming interfaces. The signal transforming units 20 are electrically connected to the interface transforming units 30. Each sub-display screen 10 of the M*N sub-display screens 10 comprises at least one sub-display screen driving circuit 40.

Each of the signal transforming units 20 is used to receive an external driving signal, send the external driving signal to an interface transforming unit 30. The interface transforming units 30 are used to receive the external driving signal and send the external driving signal to the sub-display screen driving circuits 40.

According to an embodiment of the present disclosure, a driving system for driving a display wall is disclosed. The driving system comprises a plurality of signal transforming units, a plurality of interface transforming units for transforming interfaces, and a plurality of sub-display screen driving circuits. Each of the signal transforming units is used to receive an external driving signal and send the driving signal to the interface transforming units. The interface transforming units are used to receive the external driving signal from the signal transforming units and send the external driving signal to the sub-display screen driving circuit to drive the sub-display screen to display images. The driving system merely comprises the signal transforming units, the interface transforming units, sub-display driving circuits and the sub-displays. The driving system is simple.

It means that a small number of circuit boards are required to achieving the driving of the display wall and thus the cost is reduced.

In this embodiment, the signal transforming units 20 are mainly used to transform the external driving signal into a driving signal that could be used to drive the display wall to display images. The interface transforming units are used based on the actual driving scenes. That is, different hardware equipments often comprise different hardware interfaces. Here, the hardware interfaces represent the connection mechanism between two hardware equipments. The hardware interface comprises a physical connection interface and a logical data transmission protocol.

Therefore, different hardware interfaces need a match of the physical connection and the corresponding data transmission protocol such that the data could be successfully transmitted. The hardware equipments could comprise a plurality of signal input interfaces and a plurality of signal output interfaces. The signal input interfaces and the signal output interfaces could have unmatched data transmission protocols. In this embodiment, the interface transforming unit 30 also comprises the signal input interface and the signal output interface and the data transmission protocols corresponding to signal input interface and the signal output interface do not match. The data transmission protocol corresponding to the signal input interface of the interface transforming unit 30 matches the data transmission protocol corresponding to the signal output interface of the signal transforming unit 20 such that the signal transforming unit 20 could send the signal to the signal input interface of the interface transforming unit 30 through its signal output interface.

Similarly, in this embodiment, the data transmission protocol corresponding to the signal output interface of the interface transforming unit 30 matches the data transmission protocol corresponding to the signal input end of the sub-display screen driving circuit 40. The interface transforming unit 30 could send the signal to the signal input interface of the sub-display screen driving circuit 40 through its signal output interface. Furthermore, in this embodiment, the data transmission protocol corresponding to the signal output interface of the signal transforming unit 20 does not match the data transmission protocol corresponding to the signal input end of the sub-display screen driving circuit 40. The signal transforming unit 20 cannot directly send the signal to the signal input interface of the sub-display screen driving circuit 40 through its signal output interface. Therefore, the interface transforming unit 30 is required to do the interface transformation as an interface bridge between the signal transforming unit 20 and the sub-display screen driving circuit 40.

In the above embodiment, the signal transmission protocol match means that the signal transmission protocols could be the same or different. For some specific signal transmission protocols, even if two hardware interfaces have different signal transmission protocols, the two hardware interfaces may still be able to communicate/transfer signal between them. This is because of the characteristics of some specific signal transmission protocols.

In some embodiments, when there are multiple sub-display screens, there are also multiple sub-display screen driving circuits 40 corresponding to the sub-display screens. In some embodiments, the number of the interface transforming units 30 is the same as the number of the sub-display screen driving circuits 40. Each interface transforming unit 30 is connected to only one corresponding sub-display screen driving circuit 40. That is, one interface transforming unit 30 is connected to only one corresponding sub-display screen.

When the number of the interface transforming units 30 is the same as the number of the sub-display screen driving circuits 40, the number of the signal transforming unit 20 could be the same as the interface transforming units 30. Similarly, one interface transforming unit 30 is connected to only one corresponding signal transforming unit 20.

In the above embodiment, the numbers of the signal transforming unit 20, the interface transforming units 30 and the sub-display screen driving circuits 40 are all the same. This means that one signal transforming unit 20 is connected to only one corresponding interface transforming unit 30 and one interface transforming unit 30 is connected to only one sub-display screen driving circuit 40.

In the actual driving scene, which includes but not limited to a hardware equipment having the signal transforming units 20, the interface transforming unit 30 and the sub-display screen driving circuits 40, multiple input interfaces and output interfaces are included. For example, in an embodiment, any one of the signal transforming units 20 comprises a plurality of signal input interfaces and a plurality of signal output interfaces. Any one of the signal transforming units 20 is connected to an interface transforming unit 30 through its multiple signal output interfaces. That is, one signal transforming unit 20 is connected to only one interface transforming unit 30.

In another embodiment, the number of the signal transforming units 20 could be lower than the number of the interface transforming units 30. In this case, any one of the signal transforming units 20 could be connected to multiple interface transforming units 30 through its signal output interfaces. That is, one signal transforming unit 20 is connected to multiple interface transforming units 30.

Considering the actual cost, in an ordinary case, one signal transforming unit 20 is connected to multiple interface transforming units 30. In this way, the driving function could be achieved and the cost could be reduced.

Please refer to FIG. 1 again. In the embodiment shown in FIG. 1, the driving system could further comprise a synchronization module 50. The synchronization module 50 is configured to synchronize driving signals outputted from the signal transforming units 20. Because the images shown in M*N sub-screens need to be combined into a complete image, all images shown in M*N sub-screens need to be synchronized.

In an embodiment of the present disclosure, the synchronization module 50 often controls multiple signal transforming units 20 at the same time such that the driving signals outputted by the signal transforming units 20 could be synchronous. When there are multiple synchronization modules 50, these synchronization modules 50 need to be synchronous as well. In the actual implementation, if there are multiple synchronization modules 50, then these synchronization modules 50 often use network wires to have physical connection with each other to be synchronous.

Not only the driving signals outputted by the signal transforming units 20 need to be synchronous, but also the driving signals outputted by the interface transforming units 30 need to be synchronous. In some embodiments, the interface transforming units 30 could be synchronous in timing by coaxial cables. That is, the interface transforming units 30 could use network wires to have physical connection with each other to be synchronous.

In an embodiment, the display wall often displays a 3D image. This requires a process to transform a 2D image into a 3D image for the display wall to display. Therefore, in some embodiments, the driving system could further comprises an image transforming module for transforming an image corresponding to initial driving signals into a 3D image, generating driving signals corresponding to the 3D image, and sending the generated driving signals to the signal transforming units.

As previously mentioned, the image shown in each sub-display screen is only a part of the complete image. Therefore, all the images shown in the sub-display screens are combined to show a complete 3D image. Therefore, in an embodiment, the junctions between the images (boundaries of the sub-display screens) need to be further processed to avoid image dislocation or unclear image at the junctions.

In an embodiment, the driving system further comprises an image merging module, configured to process the images at the junctions to ensure the evenness of the images at the junctions. Furthermore, in an embodiment, the initial driving signals are first inputted into the image transforming module to transform the image into a 3D image. Then, the driving signals are inputted to the image merging module. The image merging module processes the driving signals corresponding to the 3D image to make sure the image have a smooth transition at the junctions of the sub-images. And then, the image merging module sends the processed driving signals to the signal transforming units 20. The signal transforming unit 20 are mainly used to transform the driving signals into signals that can be shown in the sub-display screens.

In the actual implementation, a computer or other hardware equipments are often used to control the sub-display screens. Therefore, the signal transforming units, the interface transforming units 30 and the sub-display screen driving circuits 40 could be hardware equipments installed in the computer or the sub-display screens. The image transforming module could be a software tool installed in the computer other hardware equipments, such as a 3D transformation software application. The image merging module could be a software tool installed in the computer other hardware equipments, such as an image processing software application.

In the actual implementation, the sub-display screens often adopt V-By-One (VBO) interface. The VBO interface is the most commonly used interface between the display screen and the system chip. The sub-display screen uses the VBO interface to receive the driving signal to display the 3D image corresponding to the driving signal. Therefore, in an embodiment, the sub-display screens have VBO interface and the modules connected to the sub-display screens need to have its VBO interface to communicate with the sub-display screens.

In the actual implementation, the sub-display screen often comprises different modules to receive the external signals to display an image. The sub-display screen driving circuit is actually a circuit module in the sub-display screen. That is, the display screen actually comprises different circuits. The display screen actually uses its various circuits to receive external driving signals, which drive the circuits, such as TFTs, to work such that an image could be displayed.

Therefore, when the driving signal is inputted into the sub-display screen, it actually means that the driving signal is inputted into the sub-display screen driving circuit 40 of the sub-display screen. As previously mentioned, the sub-display screen uses the VBO interface as an input interface. This means that the input interface of the sub-display screen driving circuit 40 is the VBO interface.

Because the interface transforming unit 30 is connected to the sub-display screen driving circuit 40, the output interface of the interface transforming unit 30 needs to be the VBO interface as well such that the interface transforming unit 30 is able to communicate with the sub-display screen driving circuit 40. In this way, the VBO output interface of the interface transforming unit 30 could be connected to the VBO input interface of the sub-display screen driving circuit 40.

In an embodiment, the signal transforming unit 20 could be a graphic card in the computer or other equipments. The graphic card is mainly used to receive the image received by the computer. That is, the graphic card receives the image signals, transforms the image signals and output the transformed image signals to the display screen to display. Therefore, in an embodiment, the external driving signal is first processed by the graphic card and then the graphic card sends the driving signal to the interface transforming units 30. Then, the interface transforming units 30 sends the driving signal to the sub-display screen driving circuits 40.

Because the graphic card often has the Display Port (DP) interface as its output interface and the signal transforming unit 20 (the graphic card) is connected to the interface transforming unit 30 through its signal output interface, this means that the signal input interface of the interface transforming unit 30 should match the signal input interface of the interface transforming unit 30. In other words, the signal input interface of the interface transforming unit 30 needs to be the DP interface as well. Accordingly, in an embodiment, the signal input interface of the interface transforming unit 30 is the DP interface and the signal output interface of the interface transforming unit 30 is the VB 0 interface.

Figure 2:
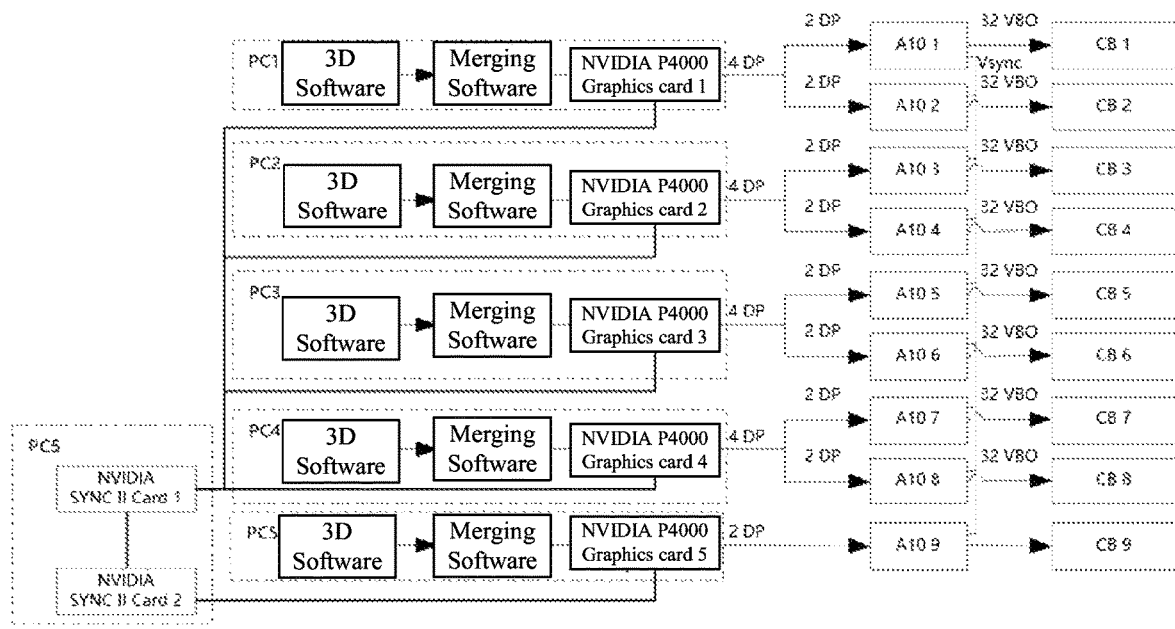
FIG. 2 is a diagram of a driving system for driving a display wall according to another embodiment of the present disclosure.

Please refer to FIG. 2. FIG. 2 is a diagram of a driving system for driving a display wall according to another embodiment of the present disclosure. As shown in FIG. 2, PC represents a computer. P4000 graphic card is the signal transforming unit 20. A10 is the Arria circuit, which is the interface transforming unit 30. CB represents a Control Board circuit board, which is the sub-display screen driving circuit 40.

In FIG. 2, the P4000 graphic card is installed inside the computer PC. The A10 circuit and the CB circuit could also be installed in the sub-display screen. In addition, each of the computers PC also includes a 3D software program and an image merging software program. The 3D software program and the image merging software program are both software tools for processing the external initial driving signals. Furthermore, in the embodiment shown in FIG. 2, the display wall could be a 3*3 structure. Because the CB circuit board is often a part of the circuit structure of the sub-display screen, FIG. 2 uses "CB" to represent the sub-display screen.

In FIG. 2, there are five computers, PC1-PC5. Each of the computers PC has a 3D software program and an image merging software program for processing the images. In addition, each of the computers PC has a P4000 graphic card. In the 3*3 sub-display screens, each of the sub-display screens comprises an A10 circuit and a CB circuit. In the same sub-display screen, the A10 circuit is electrically connected to the CB circuit.

The number of the signal transforming units 20 (the P4000 graphic cards) is lower than the number of the interface transforming units 30 (the A10 circuits). The number of the interface transforming units 30 (the A10 circuits) is the same as the number of the sub-display screen driving circuits 40 (the CB circuits). In this case, one signal transforming unit 20 could be connected to multiple interface transforming units 30. That is, one signal transforming unit 20 might be able to simultaneously control multiple sub-display screens.

Specifically, one signal transforming unit 20 could have four DP interfaces (4DP). Two of the four DP interfaces (2DP) could be connected to one interface transforming unit and the other two of the four DP interfaces could be connected to another interface transforming unit 30. In this way, one signal transforming unit 20 could simultaneously control multiple sub-display screens and reduces the cost of hardware.

In another embodiment, three of the four DP interfaces of the signal transforming unit 20 could be connected to one interface transforming unit 30. Or, all of the four DP interfaces of the signal transforming unit 20 could be connected to one interface transforming unit 30.

Considering the actual data transmission efficiency, it would be better if at least two of the four DP interfaces (2DP) of the signal transforming unit 20 are connected to one interface transforming unit 30. In this embodiment, an odd number of the signal output interfaces (the DP interface) of one signal transforming unit 20 are connected to one interface transforming unit 30.

In the above embodiments, it should be noted that the number 7680/interface number needs to be an integer while an odd number of the signal output interfaces (the DP interface) of one signal transforming unit 20 are connected to one interface transforming unit 30. This is because the display wall needs to display a 3D image of an 8K or a higher resolution and 7680 represents the pixel number of an 8K image.

However, in the above embodiments, the display wall needs to display an image of an 8K or a higher resolution. The number of the signal output interfaces of the signal transforming unit 20 is determined by the bandwidth of the video image and the data transmission rate of the signal transforming unit 20.

In general, if the data transmission rate of the DP interface is 8.1 Gbps, two DP interfaces are enough to transfer the 8K60 Hz signal. But if the data transmission rate of the DP interface is 5.4 Gbps, it requires four DP interfaces to transfer the 8K60 Hz signal.

Generally speaking, if the bandwidth of the video image is larger, then the number of required DP interface is greater. If the data transmission rate of the DP interface is lower, the number of required DP interface is greater.

The signal transforming unit 20 (the P4000 graphic card) comprises four DP output interfaces. Each of the DP interfaces has a data transmission rate of 8.1 Gbps. In this case, two of the DP interfaces are required to be connected to one interface transforming unit 30 for data transmission.

One interface transforming unit 30 (the A10 circuit) comprises two second signal input interfaces (two DP input interfaces). The two DP output interfaces of the signal transforming unit 29 are respectively connected to the two DP input interfaces of the interface transforming unit 30. Here, the data transmission rate of the two DP input interface of the interface transforming unit 30 is 8.1 Gbps.

The output of the interface transforming unit 30 (the A10 circuit) is the 32 lane VBO interfaces. Each of the 32 lane VBO interfaces has a data transmission rate of 2.97 Gbps. When the output interface of the interface transforming unit (A10 circuit) is the 32 lane VBO interface, the corresponding input interface of the sub-display screen 40 (the CB circuit) needs to be the 32 lane VBO interface as well.

In the above embodiments, the DP interface and the 32 lane VBO interface are common interface in the actual driving system. The above 8.1 Gbps, 5.4 Gbps and 2.97 Gbps are also common data transmission rates.

As shown in FIG. 2, the driving system further comprises a 3D software application (the image transforming module), which is mainly used to encode/decode the video data and to transform the video signal into a 3D video signal. Furthermore, the driving system further comprises an image merging software application (the image merging module). The image merging software application processes the original RGB data encoded/decoded by the 3D software application and processes the image data corresponding to the junctions of the sub-display screens to ensure that the image could have an even transition at the junctions and avoid the image dislocation.

In an embodiment, the image transforming module and the image merging module could be software tools, such as the 3D software application and the image merging software application, installed in the computer or could be hardware modules that could perform the same functions. In order to reduce the hardware cost, the 3D software application and the image merging software application are often implemented to achieve the image transformation and image merging functions.

In the embodiment shown in FIG. 2, the driving system further comprises a synchronization module. Specifically, the synchronization module could be the NVIDIA SYNC II card. The NVIDIA SYNC II card is a function module of the P4000 graphic card. Therefore, the NVIDIA SYNC II card controls the driving signals outputted by the P4000 graphic card.

In an embodiment, the synchronization module is connected to the signal transforming module. The synchronization module controls the driving signals outputted by the signal transforming modules to be synchronous.

As shown in FIG. 2, there are two synchronization modules (NVIDIA SYNC II card). One synchronization module controls PC1-PC4. That is, one synchronization module controls multiple signal transforming modules 20 and the other synchronization module independently controls PC5. Because there are multiple synchronization modules, these synchronization modules need to be synchronous. Specifically, these synchronization modules could be connected through a network wire to have a physical connection to be synchronous.

According to an embodiment of the present disclosure, a driving method for driving a display wall is disclosed. The driving method uses the above-mentioned driving system to perform the driving operation. The display wall includes M*N sub-display screens. The driving system comprises a plurality of interface transforming units and a plurality of signal transforming units. The interface transforming units are configured to transform interfaces. The plurality of signal transforming units, electrically connected to the plurality of interface transforming units, are configured to receive an external driving signal and send the external driving signal to the interface transforming units. Each of the M*N sub-display screens comprises a sub-display screen driving circuit. The plurality of interface transforming units are further configured to receive the external driving signal from the signal transforming units and send the external driving signal to the sub-display screen driving circuit. M is an integer greater than or equal to 1, and N is an integer greater than or equal to 1.

The driving method comprises: utilizing the signal transforming unit to receive an initial driving signal and to transform the initial driving signal to a driving signal capable of driving the display wall to display images;

utilizing the signal transforming units to send the driving signal to the interface transforming units to use the interface transforming units to achieve an interface transformation; and utilizing the interface transforming units to send the driving signal to the sub-display screen driving circuit to use the sub-display screen driving circuit to control the display wall to display images.

According to an embodiment of the present disclosure, a driving method for driving a display wall is disclosed. The driving system comprises a plurality of signal transforming units, a plurality of interface transforming units for transforming interfaces, and a plurality of sub-display screen driving circuits. Each of the signal transforming units is used to receive an external driving signal and send the driving signal to the interface transforming units. The interface transforming units are used to receive the external driving signal from the signal transforming units and send the external driving signal to the sub-display screen driving circuit to drive the sub-display screen to display images. The driving system merely comprises the signal transforming units, the interface transforming units, sub-display driving circuits and the sub-displays. The driving system is simple. It means that a small number of circuit boards are required to achieving the driving of the display wall and thus the cost is reduced.

The display wall mainly displays a 3D image. Therefore, the driving system further comprises an image transforming module. The image transforming module is mainly used to transform an image corresponding to the initial driving signals into a 3D image. Therefore, the driving method could further comprise: utilizing an image transforming module to receive an initial driving signal and to generate a driving signal corresponding to an 3D image to send to the driving signal to the signal transforming unit.

In another embodiment, because the display wall is formed by combining M*N sub-display screens, all images shown in the M*N sub-display screens are combined to form a complete image. The junctions between the images need to be further processed to avoid image dislocation or unclear image at the junctions. Therefore, the driving system further comprises an image merging module, configured to process the images at the junctions to ensure the evenness of the images at the junctions. Accordingly, the driving method could further comprise: utilizing an image merging module to receive the driving signal from the image transforming module and to merging process of the image corresponding to the driving signal such that the image at the junctions could have a smooth transition to avoid image dislocation or unclear image.

In other words, the external driving signal is first sent to the image transforming module to be transformed into an 3D image and the merging operation is performed.

In FIG. 2, the display mechanism comprises 5 computers PC1-PC5. Each PC comprises a P4000 graphic card, a 3D software application, and a merging application. The display mechanism further comprises 3*3 sub-display screens (now shown) and each of the sub-display screens comprises an A10 circuit (A101-A109) and a CB circuit (CB1-CB9).

In addition, each of the computers, such as PC5, further comprises two SYNC II synchronization cards for synchronization. The two SYNC II synchronization cards are connected through a network wire. The two SYNC II synchronization cards are synchronous.

As for the driving system shown in FIG. 2, taking the sub-display screen corresponding to CB1 as an example, the 3D software application receives the external initial driving signal and transforms the initial driving signal into 3D RGB original video data. The merging software application receives the 3D RGB original video data outputted from the 3D software application and process the 3D RGB original video data corresponding to the junctions between the sub-screen of the CB1 and other sub-display screens to ensure that the video data could have a smooth transition at the junctions.

The driving signal after the merging process is sent to the P4000 graphic card. The P4000 graphic card processes the driving signal to transform the driving signal into the driving signal that could be displayed by the sub-display screen. The transformed driving signal is sent to the A10 circuit through the two DP interfaces of the P4000 graphic card.

The A101 circuit receives the driving signal from the P4000 graphic card through its DP interfaces and sends the driving signal to the CB1 circuit through its VBO interfaces. The A10 circuit does not process the driving signal. Instead, the A10 circuit performs the interface transformation. After the CB1 circuit receives the circuit driving signal from the A10 circuit through its VBO interfaces, the CB1 circuit outputs the driving signal to the sub-display screen to display.

As for the CB2-CB9 circuits, the above methods are used to receive the driving signals for displaying.

The driving signals received from PC1-PC5 need to be synchronous. Two NVIDIA SYNC II cards are used to synchronize the driving signals.

The NVIDIA SYNC II Card1 simultaneously synchronizes the driving signals outputted from PC1-PC4. The NVIDIA SYNC II Card2 independently controls the driving signal outputted from PC5. The NVIDIA SYNC II Card1 and the NVIDIA SYNC II Card2 are synchronous such that the driving signals outputted by PC1-PC5 are synchronous.

The above embodiments merely ensure that the driving signals outputted by different graphic cards remain synchronous. The driving signals in the following process still need to remain synchronous. The driving signals outputted by A101-A109 need to remain synchronous.

In this embodiment, the A101 circuit outputs a synchronization signal and the A102-A109 circuits receive the synchronization signal from the A101 circuit and adjust the timing of the driving signals according to the synchronization signal to synchronize the driving signals in the A10 circuit.

The A101 circuit outputs the Vsync signal. The A102-A109 circuits receive the Vsync signal from the A101 circuit for performing the frame synchronization. The A102-A109 circuits regenerate and output the timing signal DE corresponding to the previous frame in the vertical blanking period (Vblank region) in a frame.

The sub-display screen not only displays the 3D screen but also displays a 3D image of 8K or higher resolution. Please refer to FIG. 2. For the driving system shown in FIG. 2, if the 3*3 sub-display screens all display 8K 3D images, then for the PC1, the received external driving signals are two 8K60 Hz signals. That is, the 3D software application processes 2*8K60 Hz signals. The signals processed by the 3D software application and sent to the merging software application are also 2*8K60 Hz signals. The merging software application sends the processed 2*8K60 Hz signals to the P4000 graphic card. Because one P4000 graphic card simultaneously controls two sub-display screens, 2*8K60 Hz signals are respectively inputted to two interface transforming units 30. Each interface transforming unit 30 receives one 8K60 Hz signal.

If each of the sub-display screens could receive and display 8K signals, the sub-display screen receives and displays images of 8K4K resolution. When the display wall is a 3*3 structure, the number of sub-display screens in horizontal or vertical directions is 3. The image shown in the display wall is (8K*3)(4K*3). In other words, the resolution of the image is 24K12K.

Because each of the video links drives an 8K4K signal, 3*3 (9) video links could output 24K12K data. It should be noted if M*N sub-display screens means another number of the sub-display screens, then a 3D image of another resolution could be correspondingly displayed.

Because each PC could only support two SYNC II cards, if the number of the sub-display screens is beyond the supporting capability of two SYNC II cards, then other PC needs to include additional SYNC II cards and the graphic card.

In addition, the functional units in the various embodiments of the present disclosure may be integrated into a processing module, or each unit may be physically present individually, or two or more units may be integrated into one module.

The above integrated module may be implemented by using hardware, or may be implemented by using a software function module. The integrated module may be stored in a computer readable storage medium if it is implemented by a software function module and is sold or used as a stand-alone product.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:

1. A driving system for driving a display wall, the display wall comprising M*N sub-display screens, and the driving system comprising:
   a plurality of interface transforming units, configured to transform interfaces; and
   a plurality of signal transforming units, electrically connected to the plurality of interface transforming units, configured to receive an external driving signal and send the external driving signal to the interface transforming units;
   wherein each of the M*N sub-display screens comprises a sub-display screen driving circuit;
   wherein the plurality of interface transforming units are further configured to receive the external driving signal from the signal transforming units and send the external driving signal to the sub-display screen driving circuit; and
   wherein M is an integer greater than or equal to 1, and N is an integer greater than or equal to 1, and a number of the signal transforming units is lower than a number of the interface transforming units.

2. The driving system of claim 1, wherein one of the interface transforming units comprises a signal input interface and a signal output interface, and
   a data transmission protocol corresponding to the signal input interface and a data transmission protocol corresponding to the signal output interface do not match.

3. The driving system of claim 2, wherein one of the signal transforming units comprises a signal input interface and a signal output interface, and a data transmission protocol corresponding to the signal input interface and a data transmission protocol corresponding to the signal output interface match.

4. The driving system of claim 1, wherein a number of the interface transforming units is identical to a number of the sub-display screen driving circuits.

5. The driving system of claim 4, wherein the number of the interface transforming units is identical to a number of the signal transforming units.

6. The driving system of claim 5, wherein one of the signal transforming units is connected to one of the interface transforming units through the signal output interfaces of the one of the signal transforming units.

7. The driving system of claim 6, wherein one of the signal transforming units is connected to some of the interface transforming units through the signal output interfaces of the one of the signal transforming units.

8. The driving system of claim 7, wherein an odd number of the signal output interfaces of one of the signal transforming units are connected to one of the interface transforming units.

9. The driving system of claim 1, further comprising:
   a synchronization module, configured to synchronize driving signals outputted from the signal transforming units.

10. The driving system of claim 9, further comprising a plurality of the synchronization modules, and the synchronization modules are physically connected through a network to be synchronous.

11. The driving system of claim 1, wherein the interface transforming units are synchronous in timing though a cable.

12. The driving system of claim 1, wherein the signal output interface of the signal transforming units is a DP interface.

13. The driving system of claim 12, wherein when a bandwidth of a video image is larger, then a number of the DP interfaces for transmitting a video signal is greater.

14. The driving system of claim 12, wherein if a transmission rate of the DP interface is lower, then a number of the DP interfaces for transmitting a video signal is greater.

15. The driving system of claim 14, wherein when the transmission rate of the DP interface is 8.1 Gbps, the number of the DP interfaces is two and the two DP interfaces transmit 8K60 Hz signals; and when the transmission rate of the DP interface is 5.4 Gbps, the number of the DP interfaces is four and the four DP interfaces transmit 8K60 Hz signals.

16. The driving system of claim 1, wherein one of the signal transforming units is a P4000 graphic card.

17. The driving system of claim 1, wherein one of the interface transforming units is an Arria 10 circuit.

18. The driving system of claim 1, further comprising:
   a screen transforming module, configured to transform a screen corresponding to an initial driving signal into a 3D screen, generate a driving signal corresponding to the 3D screen, and send the driving signal to the signal transforming units.

19. A driving method for driving a display wall comprising M*N sub-display screens, performed by a driving system that comprises:
   a plurality of interface transforming units, configured to transform interfaces; and
   a plurality of signal transforming units, electrically connected to the plurality of interface transforming units, configured to receive an external driving signal and send the external driving signal to the interface transforming units; wherein each of the M*N sub-display screens comprises a sub-display screen driving circuit;

wherein the plurality of interface transforming units are further configured to receive the external driving signal from the signal transforming units and send the external driving signal to the sub-display screen driving circuit; and wherein M is an integer greater than or equal to 1, and N is an integer greater than or equal to 1, and a number of the signal transforming units is lower than a number of the interface transforming units, the driving method comprising:

utilizing the signal transforming unit to receive an initial driving signal and to transform the initial driving signal to a driving signal capable of driving the display wall to display images;

utilizing the signal transforming units to send the driving signal to the interface transforming units to use the interface transforming units to achieve an interface transformation; and utilizing the interface transforming units to send the driving signal to the sub-display screen driving circuit to use the sub-display screen driving circuit to control the display wall to display images.

\* \* \* \* \*